United States Patent
Kusters et al.

(10) Patent No.: US 6,651,075 B1
(45) Date of Patent: Nov. 18, 2003

(54) SUPPORT FOR MULTIPLE TEMPORAL SNAPSHOTS OF SAME VOLUME

(75) Inventors: Norbert P. Kusters, Woodinville, WA (US); Luis Felipe Cabrera, Bellevue, WA (US); Brian D. Andrew, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/505,447

(22) Filed: Feb. 16, 2000

(51) Int. Cl.[7] .............................................. G06F 17/30
(52) U.S. Cl. ..................... 707/204; 707/201; 707/202; 707/203
(58) Field of Search ........................... 707/8, 100, 101, 707/200, 201, 202, 203, 204; 709/204, 217, 221, 248; 711/114, 162

(56) References Cited

U.S. PATENT DOCUMENTS

| | | | | |
|---|---|---|---|---|
| 5,369,757 A | * | 11/1994 | Spiro et al. .................. 395/575 |
| 5,403,639 A | * | 4/1995 | Belsan et al. ................ 395/600 |
| 5,649,152 A | * | 7/1997 | Ohran et al. ................. 395/441 |
| 5,956,713 A | * | 9/1999 | Bamford et al. ................ 707/8 |
| 6,023,744 A | * | 2/2000 | Shoroff et al. .................. 711/4 |
| 6,038,639 A | * | 3/2000 | O'Brien et al. .............. 711/114 |
| 6,341,341 B1 | * | 1/2002 | Grummon et al. ........... 711/162 |
| 2001/0044807 A1 | * | 11/2001 | Kleiman et al. ............. 707/203 |

* cited by examiner

Primary Examiner—Hosain T. Alam
Assistant Examiner—Jacques Veillard
(74) Attorney, Agent, or Firm—Law Offices of AlbertSS. Michalik, PLLC (57) ABSTRACT

A system and method for more efficiently maintaining multiple temporal snapshots of a common base volume. When the base volume is modified, such as when existing data is overwritten with new data, that modification may affect two or more of the snapshots. Before the modification, the existing data is copied only to the differential file associated with the latest snapshot. When a region of a selected snapshot is read, the region is read from the selected snapshot's associated differential file. If the existing data is in the differential file, that data is returned to the reading process. If later snapshots have been taken, data associated with other parts of the region may be stored in one or more of the later differential files. If the differential file of the selected snapshot does not have data for each portion of the requested region, the mechanism continues by accessing each differential file associated with subsequent snapshots in temporal order from the earliest following the selected snapshot to the latest until either the region is complete or no later snapshots remain. Finally, if any part of the region was not filled in with data from one of the differential files, then that part of the region is read from the base volume.

14 Claims, 5 Drawing Sheets

SUPPORT FOR MULTIPLE TEMPORAL SNAPSHOTS OF SAME VOLUME

FIELD OF THE INVENTION

The present invention relates to computer disk storage. More specifically, the invention relates to the creation and maintenance of logical volumes used in system crash recovery and the like.

BACKGROUND OF THE INVENTION

A "snapshot" is essentially a logical copy of the information stored on a volume at a particular instant in time. A snapshot may be used as a backup copy of the volume, but is much faster to create than a full backup. For the purpose of this discussion, a "base volume" is the actual volume of which the snapshot was taken. A snapshot system uses a differential file to track the changes written to the base volume after the snapshot is captured. When a change is written to an allocation unit (e.g. a cluster) on the base volume, the old data is copied from the allocation unit to the differential file before writing the new data. This method is often referred to as "copy-on-write." In this way, the state of the base volume at the time the snapshot was taken is accessible by reading data from the base volume in conjunction with any data stored in the differential file associated with the snapshot.

Snapshots may be taken of the base volume at different times. Existing snapshot mechanisms accomplish that by maintaining each differential file separately. Any change to the base volume results in each of the multiple differential files being updated as necessary to reflect the change. As a result, each differential file is provided with sufficient unused space to accept data representative of later writes to the base volume. However, separately maintaining differential files has a number of drawbacks, including reserving large amounts of space for each differential file, the need to check each differential file on each potential copy-on-write operation, the duplication of data across multiple differential files, and the performance degradation associated with actively maintaining multiple differential files.

An efficient mechanism for maintaining multiple snapshots of the same volume taken at different times has eluded those skilled in the art.

SUMMARY OF THE INVENTION

The present invention provides a mechanism for more efficiently maintaining multiple temporal snapshots of a common base volume. When the base volume is modified, such as when existing data is overwritten with new data, that modification may affect two or more of the snapshots. In accordance with the present invention, before the modification, the existing data is copied only to the differential file associated with the latest snapshot, whereby only that differential file need be actively maintained. By reading data from the snapshots through a method enabled through the present invention, described below, the old data need not be replicated in multiple differential files, which avoids various problems of the prior art.

When a region of a selected snapshot is read, the mechanism of the present invention reads the region from the selected snapshot. The selected snapshot may be any snapshot in a set of snapshots of the base volume taken at different times. The region may be any portion of the selected snapshot, such as a single cluster, a file or files, each comprising a set of clusters (which may be physically discontiguous), or it may be the entire selected snapshot volume. "Reading the snapshot" essentially occurs by first determining whether data associated with the region is stored in the selected snapshot's associated differential file. For instance, if new data was to be written to the base volume over existing data while a given snapshot was the most recent snapshot, the existing data is first stored in the differential file of that snapshot before the new data is written. If the existing data is in the differential file, that data is returned to the reading process. Data stored in the differential file may correspond to none, all, or only part (e.g., an allocation unit) of a given region. For instance, if less than the entire region (e.g., one of eight allocation units) was overwritten on the base volume, then only the overwritten part of the region may reside in the differential file. If later snapshots have been taken, data associated with other parts of the region may be stored in one or more of the later differential files.

If the differential file of the selected snapshot does not have data for each portion of the requested region, the mechanism continues by accessing each differential file associated with subsequent snapshots in temporal order from the earliest following the selected snapshot to the latest until either the region is complete or no later snapshots remain. During each read, the mechanism looks for data that was written to that differential file because of a change to the region on the base volume. The earliest of this data, if any, is kept as corresponding to the selected snapshot. In other words, if the selected differential file examined contains data for less than the entire region (including none of the region), then the next-latest differential file is examined for more data for the rest of the region (that part which has not already been found). If any part of the region is still missing, the next differential file is accessed to look for the missing part, and so on, until either the region is complete or no more snapshots remain. Finally, if any part of the region was not filled in with data from one of the differential files, then that part of the region is read from the base volume. The data accumulated from the various differential files or the base volume is returned to the process that requested the read of the selected snapshot. It will be appreciated that once a later snapshot is captured, the invention allows the differential file for any prior snapshot to be fixed, i.e., no longer updated, whereby unused space previously allocated to an earlier differential file may be reclaimed. Moreover, the deletion of the oldest snapshot merely involves deleting its differential file, which is very fast and efficient.

DETAILED DESCRIPTION

Exemplary Operating Environment

Figure 1:
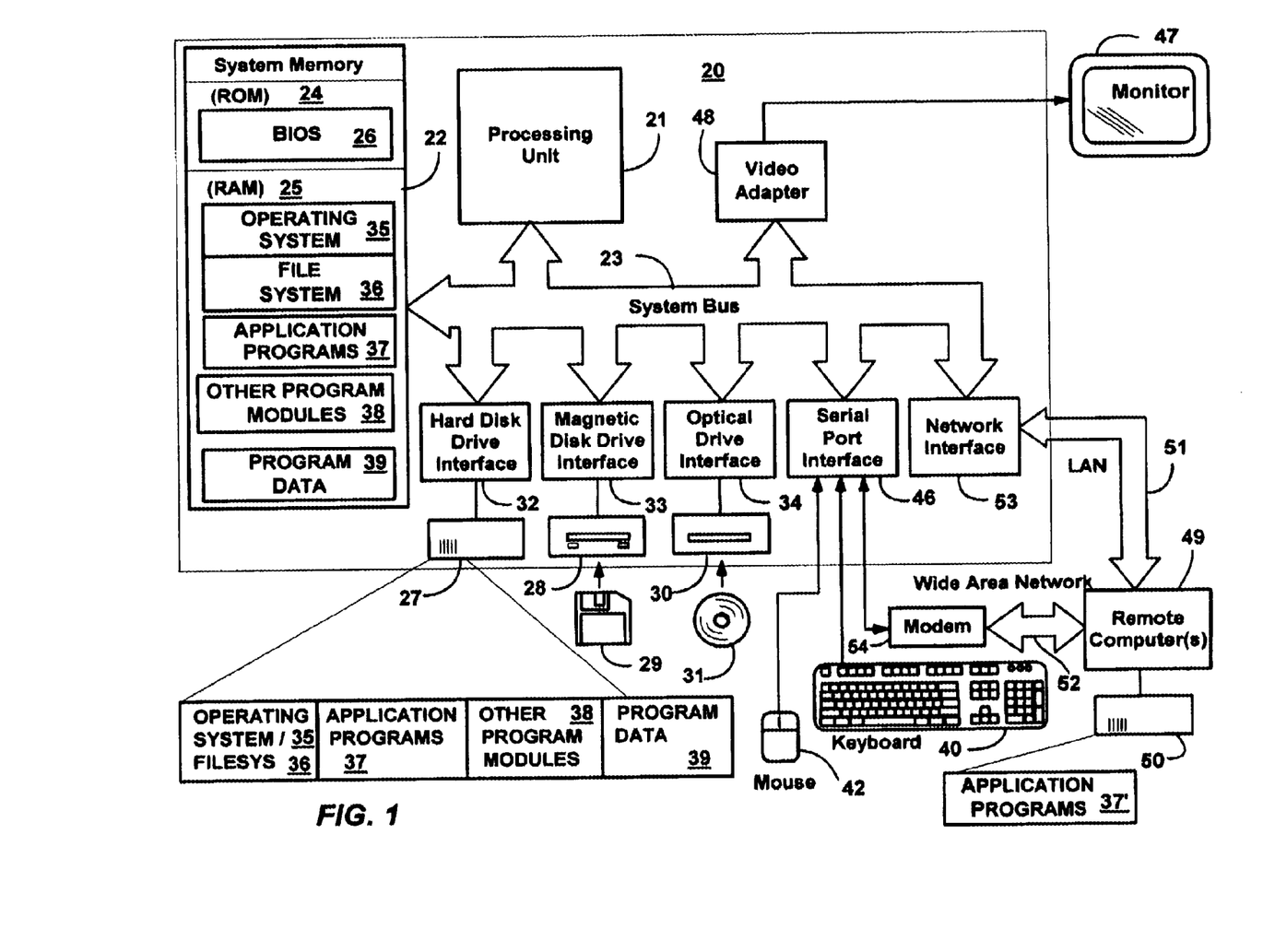
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during startup, is stored in ROM 24. The personal computer 20 may further include a hard disk-drive 27 for reading from and writing to a hard disk, not shown, a magnetic disk drive 28 for reading from or writing to a removable magnetic disk 29, and an optical disk drive.30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows® 2000). The computer 20 includes a file system 36 associated with or included within the operating system 35, such as the Windows NT® File System (NTFS), one or more application programs 37, other program modules 38 and program data 39. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers 49. The remote computer (or computers) 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The present invention may be described herein with reference to Microsoft Corporation's Windows 2000 (formerly Windows NT®) operating system, and in particular to the Windows NT® file system (NTFS). Notwithstanding, there is no intention go limit the present invention to Windows® 2000, Windows NT® or NTFS. Rather, the present invention is intended to operate with and provide benefits with any operating system, architecture, or file system.

Illustrative Snapshot System

Figure 2:
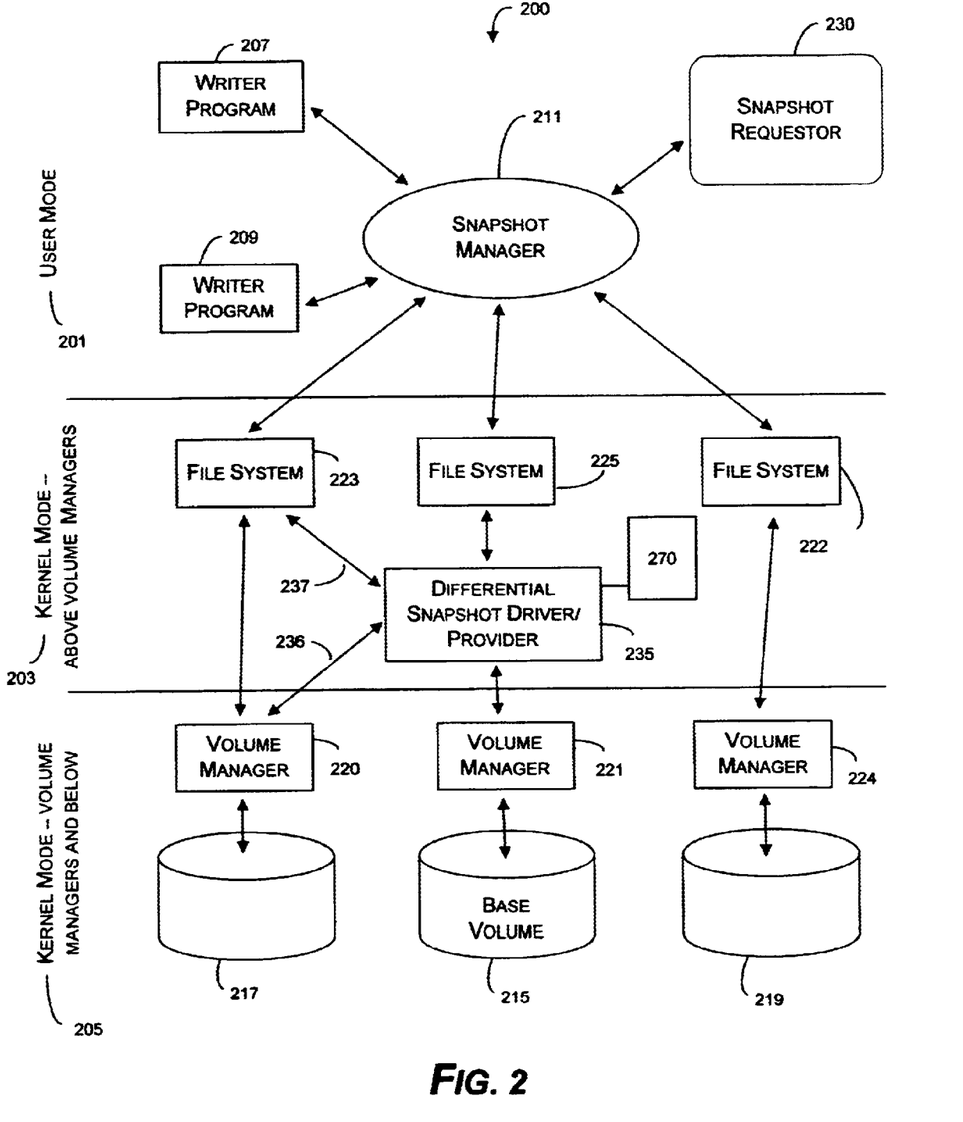
FIG. 2 is a block diagram representing a snapshot system capable of being used in conjunction with the computer system of FIG. 1 and in which the present invention may be embodied.
Figure 3:
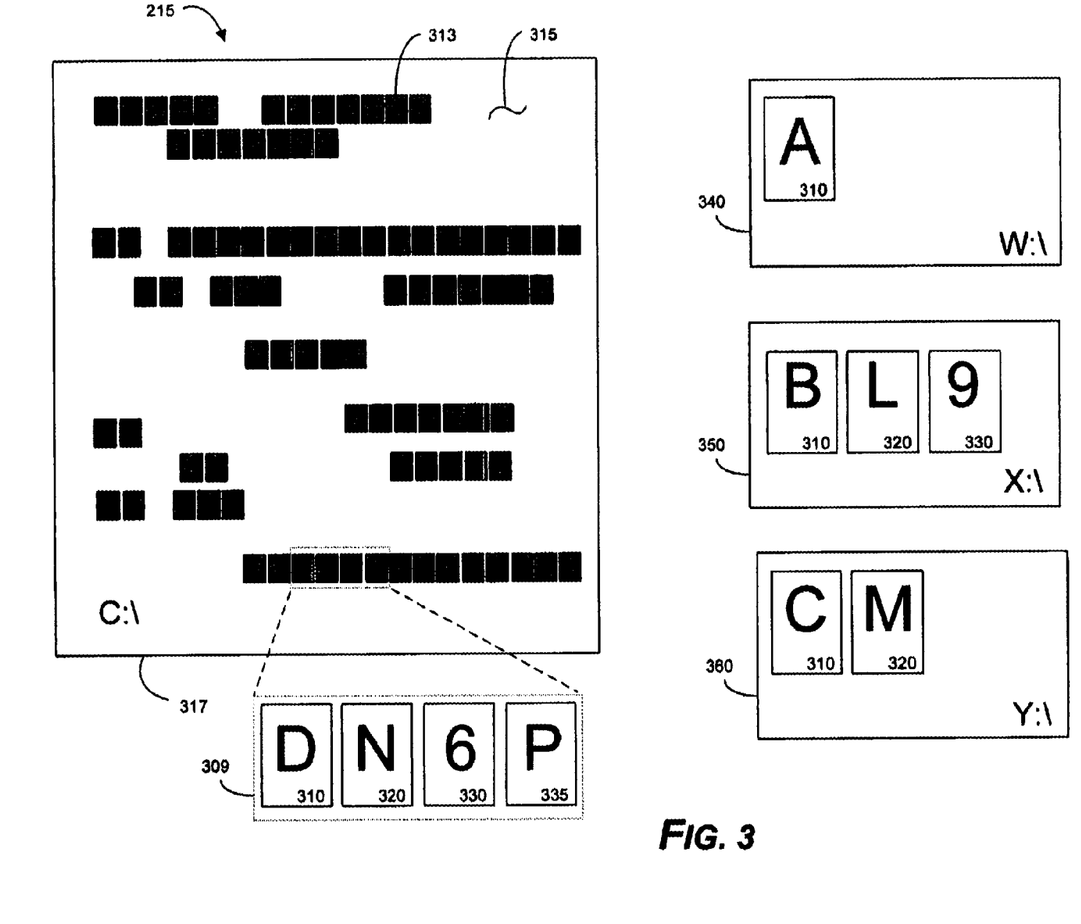
FIG. 3 is a representation of the storage space on a base volume and multiple snapshot volumes taken of the base volume at different times.

FIGS. 2–3 and the following discussion provide a brief, general description of one embodiment of a snapshot system 200 operating within the personal computer 20 and through which the invention may be implemented. Referring first to FIG. 2, various components of the snapshot system 200 may reside in either a user mode 201 or a kernel mode of the operating system 35. In this example, the kernel mode is further divided into an upper kernel mode 203 (above volume managers) and a lower kernel mode 205 (volume managers and below). The user and kernel modes are illustrated for completeness only, and are not necessary to the present invention.

Resident in the lower kernel mode 205 are three storage volumes: a base volume 215, a second volume 217, and a third volume 219. As is known in the art, a volume is a fixed amount of storage on a disk, such as hard disk 27, tape or other storage medium. The term "volume" is often used as a synonym for the storage medium itself, but it is possible for a single disk to contain more than one volume or for a volume to span more than one disk. A volume manager, such as volume manager 221, controls low-level I/O operations on behalf of its associated volume. The volume managers each interact with a corresponding file system to carry out the I/O operations on the volume. For instance, the volume manager may perform reads and writes to the physical locations on the disk constituting the volume, and the file system may maintain the allocation status of the volume and handle I/O messages on behalf of the volume. In the disclosed example, file system 222 interacts with volume manager 224 to perform I/O operations on volume 219. Although each volume manager is depicted as administering a single volume, it will be appreciated that a single volume manager may administer multiple volumes.

Executing in the user mode 201 are writer programs, such as writer program 207 and writer program 209, which may be any programs capable of initiating a change to data stored on the volumes. Common examples of writer programs are Microsoft® Word, Microsoft® Exchange, and the like. The writer programs write to or read from the volumes by issuing I/O messages to the file systems associated with each volume. Also executing in the user mode 201 is a snapshot requester 230, which is a process that may issue a request for a snapshot to be taken of one or more volumes. Two examples of a snapshot requester are a backup program and an operating system command.

A snapshot manager 211 is also included in the snapshot system 200 and resides in the user mode 201 of the illustrative snapshot system 200. The snapshot manager 211 is a program that coordinates a snapshot operation at a high level by interfacing with the writer programs, the snapshot requester 230, and other components of the snapshot system 200, such as the file systems.

Finally, a differential snapshot driver/provider (the snapshot driver) 235 is included in the snapshot system 200. The snapshot driver 235 may be a process that performs the actual operations necessary to capture and maintain a snapshot. For example, the snapshot driver 235 may perform the actual copy-on-write functions to maintain the snapshot. Alternatively, the operations necessary to capture or maintain the snapshot may be performed by hardware. (not shown) within the computer 20.

The snapshot driver 235 may be a filter driver in a driver stack (as illustrated by the driver stack of file, system 225, snapshot driver 235, and volume manager 221). Alternatively, the snapshot driver 235 may be a process executing in the kernel mode that is accessible by other drivers (as illustrated by interfaces 236 and 237). Briefly stated, the snapshot driver maintains a listing, such as bitmap 270, of those allocation units that were allocated at the time a snapshot was captured. The snapshot driver 235 compares each write operation to that listing to determine whether the write operation will overwrite data of interest (i.e., data that existed on the base volume 215 at the instant the snapshot was captured). If so, the snapshot driver 235 intercepts the write operation, copies the data to a differential file (e.g., the differential file 340 of FIG. 3), and then releases the write operation. Once copied, the snapshot bitmap 270 is updated to reflect that the data on the base volume is no longer that which existed at the snapshot instant, i.e., the overwritten area is no longer of interest to that snapshot. The operation and interaction of the components of the snapshot system 200 are described in detail below with regard to FIGS. 4 and 5.

FIG. 3 is a graphical representation of the base volume 215 in its state of allocation at an instant in time, e.g., 4:01 pm. The several shaded blocks on the base volume 215 each represent an allocation unit, such as a cluster, that contains data, such as allocation unit 313. Those allocation units that do not contain data, or are unallocated, are illustrated as free space 315. As illustrated in FIG. 3, the base volume 215 includes four allocation units (310, 320, 330, 335) the current contents of which are shown in an exploded view 309. For simplicity only, the exploded allocation units are shown in FIG. 3 containing only a single alphanumeric value. However, in contemporary file systems, a typical allocation unit may contain thousands of bytes of information, alphanumeric or otherwise. In the base volume 215, allocation unit 310 contains the letter "D," allocation unit 320 contains the letter "N," allocation unit 330 contains the number "6," and allocation unit 335 contains the letter "P." The data shown in the exploded view 309 represents the data stored on the base volume 215 at 4:01.

Three snapshot volumes (illustrated as "W:\", "X:\", and "Y:\") are also illustrated. Each snapshot volume represents the data stored on the base volume 215 at the instant each respective snapshot was captured. Each of the three illustrated snapshot volumes was captured at a different time. In this example, snapshot W:\ was captured at 1:01, X:\ was captured at 2:01, and Y:\ was captured at 3:01. The snapshot volumes W:\, X:\, Y:\ are not physical volumes, but rather logical combinations of data stored on the base volume 215 modified by differences stored in the differential files (340, 350, 360 respectively) for each snapshot volume. The differential files may be stored on a single volume, such as the base volume 215, or stored among multiple volumes, one of which may be the base volume 215.

Figure 4:
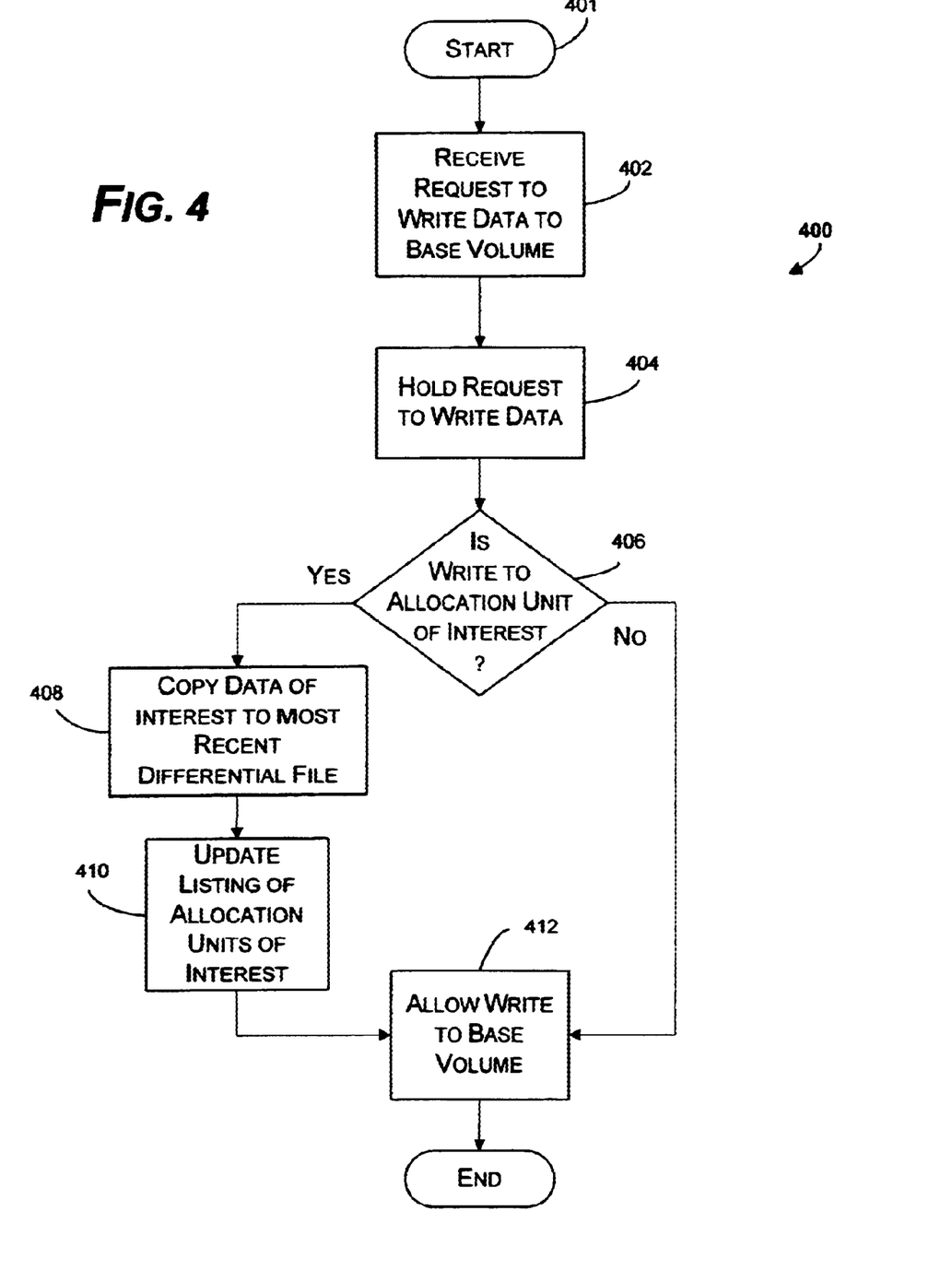
FIG. 4 is a logical flow diagram illustrating a process performed to copy-on-write original data to a differential file associated with a snapshot of the base volume in accordance with an embodiment of the present invention.

The illustrative snapshot system 200 employs one form of the copy-on-write method for populating the snapshot volumes, which is illustrated in FIG. 4 and described below. In short, as data on the base volume 215 is modified, the old data is copied to a differential file prior to new data being written.

The following example illustrates how the snapshot system 200 may function when implementing the present invention. To begin, the letter "A" was stored on the base volume 215 in allocation unit 310 at some time prior to 1:01. At some time between 1:01 and 2:01, a request was made to write the letter "B" to allocation unit 310. Thus, the snapshot driver 225 recognizes that the data in allocation unit 310 is about to be overwritten and copies the old data (the letter "A") to the differential file associated with snapshot volume W:\. At 2:01, snapshot volume X:\ was captured.

At some time between 2:01 and 3:01, a request was made to write the letter "C" to allocation unit 310 and (possibly separately) the letter "M" to allocation unit 320. In response to the request (or requests), the snapshot driver 225 recognizes that the data in allocation units 310 and 320 are about to be overwritten and copies the currently-present data (the letters "B" and "L") to the differential file associated with snapshot volume X:\. Note that the "B" does not overwrite the "A" in snapshot volume W:\, and, moreover, the original data (the letter "L") need not be copied to the earlier differential files, i.e., differential file 340 and differential file 334. Thus, in accordance with aspects of the present invention as described herein, differential file 340 (associated with snapshot volume W:\) may be fixed and any unused space reclaimed.

Operation of the Snapshot System

The following discussion of the operation of the illustrative snapshot system 200 describes, in detail, processes for determining to which differential file each change is written, and from which differential file changes are read.

Figure 5:
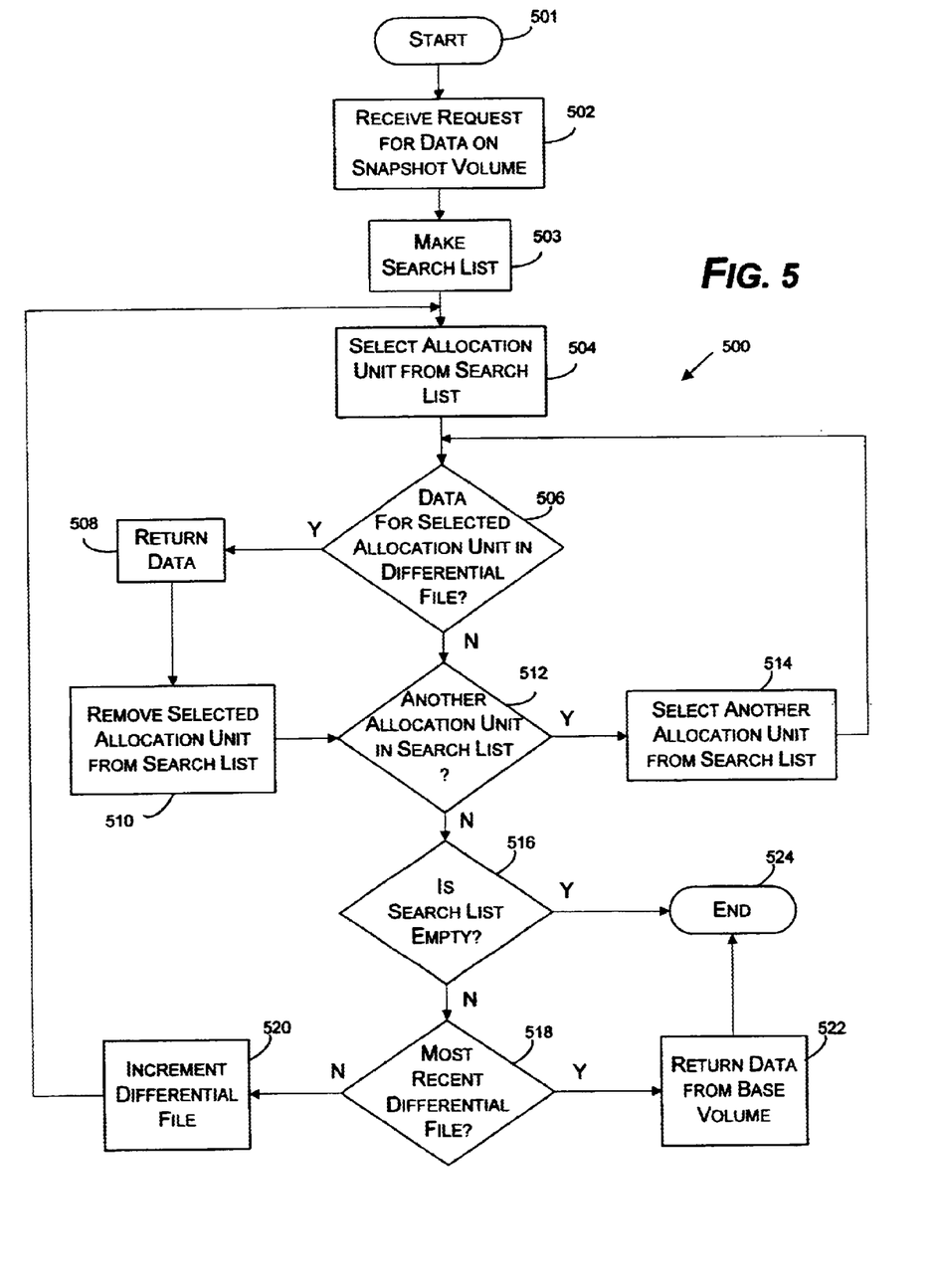
FIG. 5 is a logical flow diagram illustrating a process performed to read data from a selected snapshot of a plurality of snapshots in accordance with an embodiment of the present invention.

FIGS. 4 and 5 are logical flow diagrams illustrating processes performed by a snapshot system implementing the invention, such as the illustrative snapshot system 200. Referring first to FIG. 4, the process 400 enters at starting block 401, where a snapshot volume has been captured, and the snapshot driver 225 is prepared to maintain the snapshot. After the snapshot is created, the process proceeds to block 402.

At block 402, the process 400 awaits a notice from the file system 235 that a write is being attempted to an allocation unit on the base volume 215. When the snapshot driver 235 receives a request from the file system 225 to write data to the base volume 215, the process proceeds to block 404, where the snapshot driver 235 holds the write request. The process then continues at decision block 406.

At decision block 406, the snapshot driver 235 determines, on a per-allocation unit basis, whether the write request is directed to each allocation unit of interest on the base volume 215, i.e., that currently contains data that existed at the instant the snapshot was captured. Toward that end, the snapshot driver 235 may maintain a listing, such as the snapshot bitmap 270, of allocation units of interest. In that case, the snapshot driver 235 may compare the intended allocation unit of the write request with the snapshot bitmap 270 to determine if the original data should be copied. If the write request is not directed to an allocation unit of interest, the process proceeds to block 412, where the snapshot driver 235 allows the write operation to proceed. On the other hand, if the write is to an area of interest, the process continues to block 408.

At block 408, the data is copied from the allocation unit of interest to the most recent differential file 319. The snapshot driver 235 may issue a message to the file system 235 to actually perform the copy of the data.

The following example illustrates the evaluation process of block 406 and the copying process at block 408 with reference to FIG. 3. At 2:01, allocation unit 320 contained the letter "L." Accordingly, when the snapshot volume X:\ was created, the snapshot bitmap 270 indicates that allocation unit 320 is of interest. At some time after 2:01, the snapshot driver-235 receives a request to write the letter "M" to allocation unit 320. By comparing the write request to the snapshot bitmap 270 (block 406), the snapshot driver 235 determines that the write request is to an allocation unit of interest, and thus performs the copy (block 408).

At block 410, the snapshot driver 235 updates its listing of allocation units of interest by clearing the entry associated with the allocation unit copied at block 408. In this manner, future writes to the allocation unit copied at block 408 will not be copied to the same differential file. The process then proceeds to block 412, where the snapshot driver 235 allows the write operation to proceed by releasing the write request or passing the write request to a lower-level driver, such as the volume manager 221. The process 400 continues in this fashion for the useful life of the relevant snapshot volume.

In keeping with the invention as set forth above, the existing data is not copied to all differential files if multiple snapshots exist, but rather only to the most recent one. This example will illustrate the process. Returning to FIG. 3, at 2:01 allocation unit 330 contained the number "9." Allocation unit 330 was then modified (to the number "6") some time after 2:01 but before 3:01. Accordingly, a read of allocation unit 330 from snapshot volume Y:\ should return the number "6." Thus, because the data has not changed since snapshot volume Y:\ was captured, the data stored in allocation unit 330 on the base volume 215 is properly returned. However, a read of allocation unit 330 from snapshot volume X:\ should return the number "9" (the data stored on the base volume 215 when snapshot volume X:\ was captured). Thus, when the number "6" was written to allocation unit 330, the number "9" was copied to the then-latest differential file 350 associated with snapshot volume X:\.

It should be noted that the number "9" was not copied to the earlier differential file 340 associated with snapshot volume W:\ even though a read of allocation unit 330 from snapshot volume W:\ should also return the number "9." That benefit is made possible through the process 500 of reading multiple differential files illustrated in FIG. 5 and described below.

FIG. 5 illustrates a process 500 for reading multiple snapshot volumes taken of the base volume 215 at different times. The process 500 enters at starting block 501, where one or more snapshot volumes have been captured, and old data has been copied to their associated differential files in accordance with the process 400 illustrated in FIG. 4 and described above. Processing begins at block 502.

At block 502, the snapshot driver 235 receives a request for data stored on a selected snapshot volume, such as snapshot volume W:\. For example, the read request is placed by an application program, and is converted by the file system 225 into one or more requests to read allocation units, whereby each such request is intercepted by the snapshot driver 235. It should be noted that more than a single allocation unit may be requested. Often, the request will take the form of a read of some or all of a file that spans multiple allocation units. Likewise, the request may be a read of the entire snapshot volume. In this example, the request may be for a region including each allocation unit in the exploded view 309. When the snapshot driver 235 receives the request, the process 500 continues to block 503.

At block 503, the snapshot driver 235 builds a search list or the like that identifies each allocation unit in the read request. For example, if the read request is for a file made up of the allocation units in the exploded view 309, the search list or the like would include allocation unit 310, allocation unit 320, allocation unit 330, and allocation unit 335. When the search list or the like is complete, the process continues to block 504.

At block 504, the snapshot driver 235 selects an allocation unit from the search list or the like, and the process continues to decision block 506.

At decision block 506, a determination is made whether data is stored in the differential file associated with the allocation unit selected at block 504. To make a determination, the snapshot driver 235 may examine an index associated with the differential file for the selected snapshot volume. If the data is not in the differential file, the process continues to decision block 512, described below. If the data is in the differential file, the process continues to block 508.

At block 508, the data located at decision block 506 is returned. The index may be used to determine where the data is located within the differential file. It should be noted that returning the data may include storing the data in a buffer to be later returned with other data when the buffer is filled. In this example, allocation unit 310 is reflected in the differential file 340, so the letter "A" is returned (or added to a buffer). For efficiency, rather than read data from the differential file or differential files for each pass through block 508, the snapshot driver 235 may accumulate a listing of the data to be read from the relevant differential file or differential files. The reading operations can then be structured for efficient disk access. The process continues at block 510.

At block 510, the selected allocation unit is removed from the search list or the like to avoid overwriting the proper data with data that may be stored in later differential files and that is associated with the selected allocation unit. Because the earliest data located in the process 500 is the proper data, each allocation unit is removed from the search list as its valid data is located. The process continues at decision block 512.

At decision block 512, a determination is made whether another allocation unit remains to be searched in the search list. If another allocation unit remains in the search list, the process 500 branches to block 514 where another allocation unit is selected. The process 500 then returns to decision block 506, where the search is repeated for that allocation unit. If there are no other allocation units remaining in the search list, the process instead branches to decision block 516.

At decision block 516, a determination is made whether the search list is empty. For example, through the steps performed at decision block 506, block 508, block 510, decision block 512, and block 514, data may have been located for every allocation unit in the search list. Accordingly, every allocation unit would have been removed from the search list at block 510, whereby the search list would be empty. If the search list is empty, the process continues to ending block 524, described below. If the search list is not empty, the process 500 continues at decision block 518.

At decision block 518, a determination is made whether the current differential file is the most recent differential file. It should be appreciated that the first pass through the process 500, the current differential file is the differential file associated with the selected snapshot volume (W:\ in the present example). Continuing with the example, at this juncture, the current differential file is the one associated with snapshot volume W:\ (i.e., differential file 340), and, thus, as represented in FIG. 3, the current differential file is not the most recent. If the current differential file is the most recent, the process 500 continues to block 522, described below. If the current differential file is not the most recent, the process 500 continues to block 520.

At block 520, the current differential file is incremented to the next-latest differential file. In this example, the first pass through the process 500, subsequent differential file is the one associated with snapshot volume X:\ (i.e., differential file 350). The process then returns to block 504 which performs as described above, this time using the subsequent differential file. The loop including blocks 504–518 is repeated until either the search list is empty, or until the most-recent differential file (Y:\) is reached at decision block 518, in which case, via decision block 518, the process 500 continues to block 522.

At block 522, data associated with at least one allocation unit in the requested region was not located in the differential file associated with the selected snapshot, or any later differential file. Therefore, the data associated with any unlocated allocation units is identified as needing to be returned from the base volume 215. For example, if each allocation unit in the exploded view 309 was requested, it will be appreciated that the letter "A" is to be (or has been) returned for allocation unit 310, the letter "L" for allocation unit 320, and the number "9" for allocation unit 330. However, no data was stored in any differential for allocation unit 335. Thus, at block 522, the data stored in allocation unit 335 on the base volume 215 (i.e., the letter "P") is returned (or added to the buffer). The process 500 ends at ending block 524, where the snapshot driver 235 causes "AL9P" to be returned to the process requesting the read of the snapshot volume.

It should be appreciated that the process 500 returns only the first value located with respect to any allocation unit when accessing a series of temporally-ordered differential files. In other words, when the letter "L" is located for allocation unit 320 in differential file 350, the process 500 does not continue searching for data stored in later differential files (i.e., differential file 360) for allocation unit 320. In this-manner, data need not be duplicated in more than one differential file for any particular allocation unit. In addition, as will be appreciated, once a snapshot is captured, because data need not be copied to earlier differential files, the earlier differential files may be fixed and any unused allocated space may be reclaimed by the file system 225, thereby conserving resources.

The following example illustrates how the snapshot system 200 may implement the process 500 illustrated in FIG. 5. When a process "reads" a region of a selected snapshot volume, essentially the snapshot driver 235 determines whether original data associated with the region is stored in the selected snapshot's associated differential file or a later differential file. If the original data is in one of those differential files, the earliest set of that data relative to the selected snapshot is returned to the reading process. Otherwise, the data currently stored in the region on the base volume 215 is returned. For instance, if a reading process requests a read from Y:\ in a region having data stored in allocation unit 320, the letter "M" would be returned-for that allocation-unit. However, if the reading process requests from W:\ the data stored in allocation unit 320, the letter "L" is returned (not the letter "M"). Alternatively, if the reading process requests from Y:\ the data stored in allocation unit 335, the letter "P" (from the base volume 215) would be returned.

In summary, the present invention provides a system and method for efficiently maintaining multiple snapshot volumes taken at different times of the same base volume. From a review of the preceding detailed description, it will be appreciated that original data may be copied to only one differential file, i.e., the differential file associated with the most recent snapshot volume, which, when the snapshot volumes are read in the disclosed manner, avoids the prior need to duplicate the data in each differential file. Moreover, because the invention overcomes the need to store data in differential files other than the most-recent differential file, the earlier differential files may be fixed and unused space reclaimed.

What is claimed is:

1. A computer-readable medium having computer-executable instructions, comprising:
   retaining a plurality of ordered snapshots associated with a base volume, wherein each snapshot includes an associated differential file; and
   providing access to a region of a selected snapshot in the plurality of ordered snapshots, by
      determining whether data associated with at least part of the region exists in the differential file associated with the selected snapshot;

if the data exists in the differential file associated with the selected snapshot, associating the data with the at least part of the region; and if the data does not exist in the differential file associated with the selected snapshot, determining if the data exists in a second differential file associated with a second snapshot in the plurality of ordered snapshots, wherein the second snapshot is later than the selected snapshot; and if the data exists in the second differential file associated with the second snapshot, associating the data with the at least part of the region.

2. The computer-readable medium of claim 1, wherein if the data does not exist in the second differential file associated with the second snapshot, determining if the data exists in a third differential file associated with a third snapshot, wherein the third snapshot is later than the second snapshot.

3. The computer-readable medium of claim 1, wherein if the data does not exist in the second differential file associated with the second snapshot, obtaining the data from the base volume.

4. The computer-readable medium of claim 1, wherein retaining the plurality of ordered snapshots includes fixing at least one differential file associated with a corresponding snapshot of the plurality of ordered snapshots.

5. The computer-readable medium of claim 4, further comprising reclaiming unused space allocated to at least one of the fixed differential files.

6. The computer-readable medium of claim 1, wherein providing access to the region includes receiving a request for data associated with the region from the selected snapshot.

7. The computer-readable medium of claim 1, wherein the at least part of the region comprises an allocation unit.

8. In a computing environment, a method comprising:

receiving a request to read information from a selected snapshot in a plurality of snapshots of a base volume, the selected snapshot being operative to identify a set of data stored on the base volume at a given instant, each snapshot having an associated differential file;

decomposing the request into a plurality of requests, each request corresponding to at least one allocation unit;

selecting a differential file corresponding to the selected snapshot as a current differential file;

for each request in the plurality of requests:

(a) determining whether the current differential file contains data that satisfies the request, and:
   (1) if so, reading the data to satisfy the request, and
   (2) if not, determining whether a next most recent snapshot having an associated differential file exists, and
(i) if a next most recent snapshot exists, selecting the differential file corresponding to the next most recent snapshot as the current differential file and returning to step (a);
(ii) if a next most recent snapshot does not exist, reading the data from the base volume to satisfy the request.

9. The method of claim 8 wherein decomposing the request into a plurality of requests comprises constructing a search list.

10. The method of claim 9 further comprising removing a request from the search list when the data is read therefor.

11. The method of claim 10 wherein each request in the search list is processed for the current differential file before determining whether a next most recent snapshot having an associated differential file exists.

12. A computer-readable medium having computer-executable instructions for performing the method of claim 8.

13. In a computing environment, a method comprising:

receiving a request to read information from a selected snapshot in a plurality of snapshots of a base volume, the selected snapshot being operative to identify a set of data stored on the base volume at a given instant, each snapshot having a corresponding differential file;

decomposing the request into a plurality of requests, each request corresponding to at least one allocation unit;

for each differential file, starting with the differential file corresponding to the selected snapshot and moving to each more recent differential file until the request is satisfied or no more recent differential file exists, reading data from the differential file for each request of the plurality that has data in the differential file; and if no more recent differential file exists and the request is not fully satisfied, reading data from the base volume to fully satisfy the request.

14. A computer-readable medium having computer-executable instructions for performing the method of claim 13.

* * * * *